US012646357B2

(12) United States Patent
Babazaki

(10) Patent No.: US 12,646,357 B2
(45) Date of Patent: Jun. 2, 2026

(54) ACTION RECOGNITION APPARATUS, TRAINING APPARATUS, ACTION RECOGNITION METHOD, TRAINING METHOD, AND STORAGE MEDIUM

(71) Applicant: NEC Corporation, Tokyo (JP)

(72) Inventor: Yasunori Babazaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 231 days.

(21) Appl. No.: 18/380,055

(22) Filed: Oct. 13, 2023

(65) Prior Publication Data

US 2024/0135751 A1     Apr. 25, 2024
US 2024/0233442 A9     Jul. 11, 2024

(30) Foreign Application Priority Data

Oct. 25, 2022    (JP) ................................. 2022-170906

(51) Int. Cl.
G06V 40/20        (2022.01)
G06V 10/774      (2022.01)
G06V 20/52       (2022.01)

(52) U.S. Cl.
CPC ............ *G06V 40/23* (2022.01); *G06V 10/774* (2022.01); *G06V 20/52* (2022.01)

(58) Field of Classification Search
CPC ...... G06V 40/23; G06V 10/774; G06V 20/52; G06V 40/20; G06V 10/82
See application file for complete search history.

(56) References Cited

U.S. PATENT DOCUMENTS

2022/0138963 A1*   5/2022   Law ........................ G06T 7/246
                                         382/107
2022/0354387 A1*   11/2022   Ogasawara ........... A61B 5/1118
2023/0306489 A1*   9/2023   Kong ....................... G06N 5/04

FOREIGN PATENT DOCUMENTS

JP      2021-117635 A     8/2021
JP      2022-075518 A     5/2022
JP      2022-086650 A     6/2022
WO    WO-2018163555 A1*   9/2018   ............. G08B 25/00
WO    2021/145185 A1     7/2021

* cited by examiner

*Primary Examiner* — Delomia L Gilliard
(74) *Attorney, Agent, or Firm* — Sughrue Mion, PLLC

(57)           ABSTRACT

A provided technique accurately recognizes an action of a person even in a time zone in which a region related to an action of the person is not sufficiently shown in an image sequence. An action recognition apparatus includes: a first calculation section for calculating, based on a first partial sequence in an image sequence constituting a time series, first action feature information indicating an action feature of a person included as a subject in an image in the first partial sequence; a second calculation section for calculating, based on past feature information calculated based on a second partial sequence including at least one past image prior to the first partial sequence in the image sequence, second action feature information obtained by correcting the first action feature information; and an action recognition section for recognizing an action of the person based on the second action feature information.

11 Claims, 10 Drawing Sheets

EXAMPLE: FIXED LENGTH L = 3

S20

ACTION RECOGNITION APPARATUS, TRAINING APPARATUS, ACTION RECOGNITION METHOD, TRAINING METHOD, AND STORAGE MEDIUM

This Nonprovisional application claims priority under 35 U.S.C. § 119 on Patent Application No. 2022-170906 filed in Japan on Oct. 25, 2022, the entire contents of which are hereby incorporated by reference.

TECHNICAL FIELD

The present invention relates to a technique for recognizing an action of a person.

BACKGROUND ART

Patent Literature 1 discloses a technique in which a posture feature of a person and a peripheral feature that indicates a shape, a position, or a type of a surrounding object of the person are extracted from an image sequence generated by an imaging apparatus, and an action of the person is recognized based on the posture feature and the peripheral feature.

CITATION LIST

Patent Literature

[Patent Literature 1]
    International Publication No. WO 2018/163555

SUMMARY OF INVENTION

Technical Problem

In the description of Patent Literature 1, there is a problem that, in a case where there is a time zone in which a region related to an action of a person is not sufficiently shown in an image sequence generated by the imaging apparatus, it is sometimes impossible to correctly recognize an action of the person.

An example aspect of the present invention is accomplished in view of the above problems, and its example object is to provide a technique for accurately recognizing an action of a person even in a case where there is a time zone in which a region related to an action of the person is not sufficiently shown in an image sequence.

Solution to Problem

An action recognition apparatus in accordance with an example aspect of the present invention includes at least one processor, the at least one processor carrying out: a first calculation process of calculating, based on a first partial sequence in an image sequence constituting a time series, first action feature information that indicates a feature of an action of a person who is included as a subject in an image included in the first partial sequence; a second calculation process of calculating, based on past feature information, second action feature information obtained by correcting the first action feature information, the past feature information having been calculated based on a second partial sequence including at least one past image which is prior to the first partial sequence in the image sequence; and an action recognition process of recognizing an action of the person based on the second action feature information.

A training apparatus in accordance with an example aspect of the present invention includes at least one processor, the at least one processor carrying out: a training process of training the above described action recognition apparatus with use of a training data set in which an image sequence constituting a time series is associated with action information that indicates an action of a person who is included as a subject in an image included in the image sequence.

An action recognition method in accordance with an example aspect of the present invention includes: a first calculation process in which at least one processor calculates, based on a first partial sequence in an image sequence constituting a time series, first action feature information that indicates a feature of an action of a person who is included as a subject in an image included in the first partial sequence; a second calculation process in which the at least one processor calculates, based on past feature information, second action feature information obtained by correcting the first action feature information, the past feature information having been calculated based on a second partial sequence including at least one past image which is prior to the first partial sequence in the image sequence; and an action recognition process in which the at least one processor recognizes an action of the person based on the second action feature information.

A training method in accordance with an example aspect of the present invention includes: a training process in which at least one processor trains the above described action recognition apparatus with use of a training data set in which an image sequence constituting a time series is associated with action information that indicates an action of a person who is included as a subject in an image included in the image sequence.

A non-transitory storage medium in accordance with an example aspect of the present invention stores a program for causing a computer to carry out: a first calculation process of calculating, based on a first partial sequence in an image sequence constituting a time series, first action feature information that indicates a feature of an action of a person who is included as a subject in an image included in the first partial sequence; a second calculation process of calculating, based on past feature information, second action feature information obtained by correcting the first action feature information, the past feature information having been calculated based on a second partial sequence including at least one past image which is prior to the first partial sequence in the image sequence; and an action recognition process of recognizing an action of the person based on the second action feature information.

Advantageous Effects of Invention

According to an example aspect of the present invention, even in a case where there is a time zone in which a region related to an action of a person is not sufficiently shown in an image sequence, it is possible to accurately recognize an action of the person.

BRIEF DESCRIPTION OF DRAWINGS

FIG. 6 is a schematic diagram illustrating an example of an inference data set DS1 in the third example embodiment of the present invention.

EXAMPLE EMBODIMENTS

First Example Embodiment

The following description will discuss a first example embodiment of the present invention in detail with reference to the drawings. The present example embodiment is a basic form of second through fourth example embodiments described later.

(Configuration of Action Recognition Apparatus 1)

Figure 1:
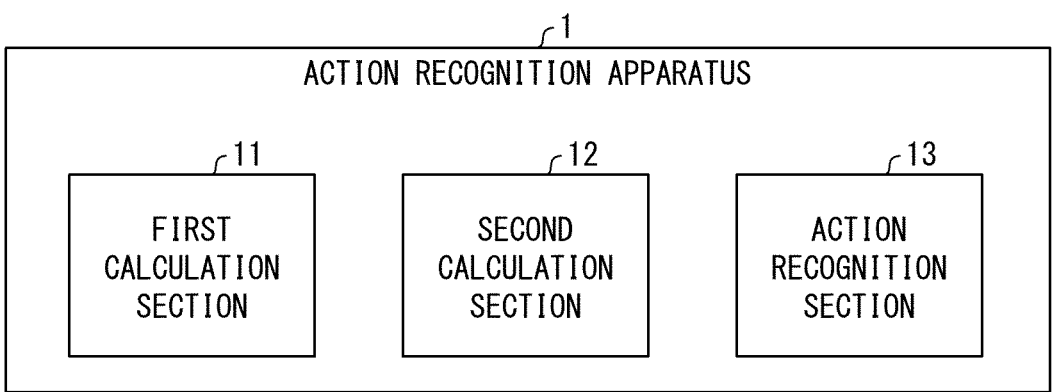
FIG. 1 is a block diagram illustrating a configuration of an action recognition apparatus in accordance with a first example embodiment of the present invention.

The following description will discuss a configuration of an action recognition apparatus 1 in accordance with the present example embodiment with reference to FIG. 1. FIG. 1 is a block diagram illustrating the configuration of the action recognition apparatus 1. As illustrated in FIG. 1, the action recognition apparatus 1 includes a first calculation section 11, a second calculation section 12, and an action recognition section 13. The first calculation section 11 calculates, based on a first partial sequence in an image sequence constituting a time series, first action feature information that indicates a feature of an action of a person who is included as a subject in an image included in the first partial sequence. The second calculation section 12 calculates second action feature information, which is obtained by correcting the first action feature information, based on past feature information which has been calculated based on a second partial sequence including at least one past image which is prior to the first partial sequence in the image sequence. The action recognition section 13 recognizes an action of a person based on the second action feature information.

(Program Implementation Example)

In a case where the action recognition apparatus 1 is configured by a computer, a program below in accordance with the present example embodiment is stored in a memory of the computer. The program causes a computer to function as: a first calculation section 11 for calculating, based on a first partial sequence in an image sequence constituting a time series, first action feature information that indicates a feature of an action of a person who is included as a subject in an image included in the first partial sequence; a second calculation section 12 for calculating, based on past feature information, second action feature information obtained by correcting the first action feature information, the past feature information having been calculated based on a second partial sequence including at least one past image which is prior to the first partial sequence in the image sequence; and an action recognition section 13 for recognizing an action of the person based on the second action feature information.

(Flow of Action Recognition Method S1)

Figure 2:
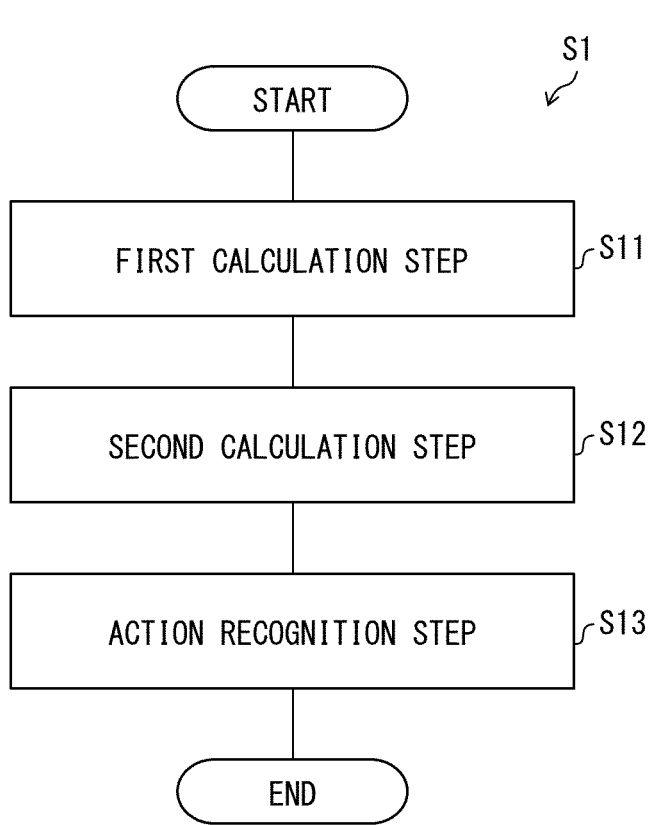
FIG. 2 is a flowchart illustrating a flow of an action recognition method in accordance with the first example embodiment of the present invention.

The action recognition apparatus 1 configured as described above carries out an action recognition method S1 in accordance with the present example embodiment. The following description will discuss a flow of the action recognition method S1 with reference to FIG. 2. FIG. 2 is a flowchart illustrating the flow of the action recognition method S1. As illustrated in FIG. 2, the action recognition method S1 includes step S11 (first calculation step), step S12 (second calculation step), and step S13 (action recognition step).

In step S11, the first calculation section 11 calculates, based on a first partial sequence in an image sequence constituting a time series, first action feature information that indicates a feature of an action of a person who is included as a subject in an image included in the first partial sequence. In step S12, the second calculation section 12 calculates second action feature information, which is obtained by correcting the first action feature information, based on past feature information which has been calculated based on a second partial sequence including at least one past image which is prior to the first partial sequence in the image sequence. In step S13, the action recognition section 13 recognizes an action of a person based on the second action feature information.

(Example Advantage of Present Example Embodiment)

As described above, the present example embodiment employs the configuration of: calculating, based on a first partial sequence in an image sequence constituting a time series, first action feature information that indicates a feature of an action of a person who is included as a subject in an image included in the first partial sequence; calculating, based on past feature information, second action feature information obtained by correcting the first action feature information, the past feature information having been calculated based on a second partial sequence including at least one past image which is prior to the first partial sequence in the image sequence; and recognizing an action of the person based on the second action feature information. Therefore, according to the present example embodiment, even in a case where there is a time zone in which a region related to an action of a person is not sufficiently shown in an image sequence, it is possible to accurately recognize an action of the person.

Second Example Embodiment

The following description will discuss a second example embodiment of the present invention in detail with reference to the drawings. The present example embodiment is a basic form of third and fourth example embodiments described later.

(Configuration of Training Apparatus 2)

Figure 3:
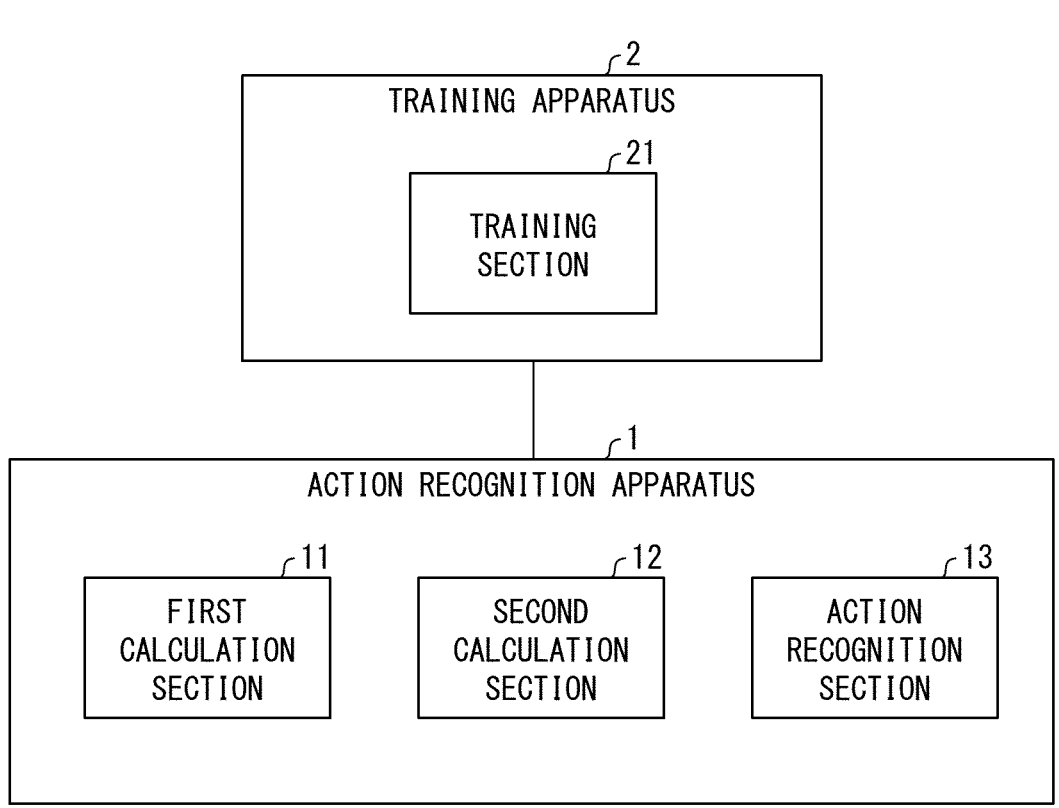
FIG. 3 is a block diagram illustrating a configuration of a training apparatus in accordance with a second example embodiment of the present invention.

The following description will discuss a configuration of a training apparatus 2 in accordance with the present example embodiment with reference to FIG. 3. FIG. 3 is a block diagram illustrating the configuration of the training apparatus 2. As illustrated in FIG. 3, the training apparatus 2 includes a training section 21. The training section 21 trains the action recognition apparatus 1 in accordance with the first example embodiment with use of a training data set in which an image sequence constituting a time series is associated with action information that indicates an action of a person who is included as a subject in an image included in the image sequence. The configuration of the action recognition apparatus 1 is as described above.

(Program Implementation Example)

In a case where the training apparatus 2 is configured by a computer, a program below in accordance with the present example embodiment is stored in a memory of the computer. The program causes a computer to function as a training section 21 that trains the action recognition apparatus 1 in accordance with the first example embodiment with use of a training data set in which an image sequence constituting a time series is associated with action information that indicates an action of a person who is included as a subject in an image included in the image sequence.

(Flow of Training Method S2)

Figure 4:
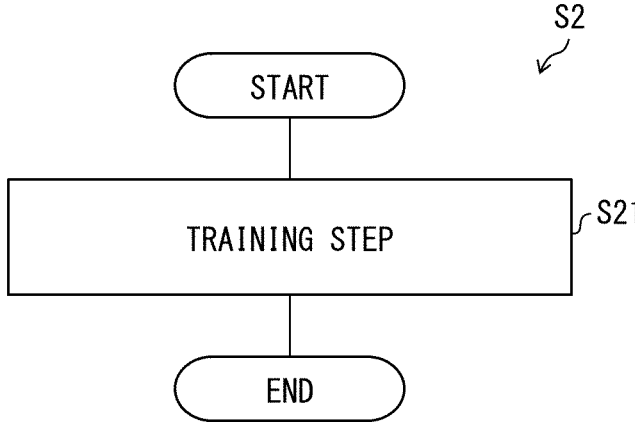
FIG. 4 is a flowchart illustrating a flow of a training method in accordance with the second example embodiment of the present invention.

The training apparatus 2 configured as described above carries out a training method S2 in accordance with the present example embodiment. The following description will discuss a flow of the training method S2 with reference to FIG. 4. FIG. 4 is a flowchart illustrating the flow of the training method S2. As illustrated in FIG. 4, the training method S2 includes step S21 (training step).

In step S21, the training section 21 trains the action recognition apparatus 1 in accordance with the first example embodiment with use of a training data set in which an image sequence constituting a time series is associated with action information that indicates an action of a person who is included as a subject in an image included in the image sequence.

(Example Advantage of Present Example Embodiment)

As described above, the present example embodiment employs the configuration of training the action recognition apparatus 1 in accordance with the first example embodiment with use of a training data set in which an image sequence constituting a time series is associated with action information that indicates an action of a person who is included as a subject in an image included in the image sequence. Therefore, by using the action recognition apparatus 1 which has been trained using the present example embodiment, it is possible to bring about an example advantage of accurately recognizing an action of a person even in a case where there is a time zone in which a region related to an action of the person is not sufficiently shown in an image sequence.

Third Example Embodiment

The following description will discuss a third example embodiment of the present invention in detail with reference to the drawings. The same reference numerals are given to constituent elements which have functions identical with those described in the first example embodiment, and descriptions as to such constituent elements are omitted as appropriate.

As the present example embodiment, the following description will discuss an example aspect in which an image included in an image sequence in the first example embodiment includes one or both of a person and an object as a subject(s). The technique disclosed in Patent Literature 1 has a problem that, in a case where there is a time zone in which an object related to an action of a person is not sufficiently shown in an image sequence, it is sometimes impossible to correctly recognize an action of the person. For example, there is a case in which, in a video obtained by imaging an operator who carries out a rolling compaction operation at a construction site or the like, a rolling compaction tool is hidden by (i.e., not sufficiently shown due to) the operator, another operator, or another object, depending on a time zone. In this case, there is a possibility that the technique disclosed in Patent Literature 1 recognizes that the operator is carrying out another operation, even though the operator is actually continuing the rolling compaction operation. The present example embodiment is an example aspect for solving such a problem of action recognition accuracy caused due to hiding of an object.

(Configuration of Action Recognition Apparatus 10)

Figure 5:
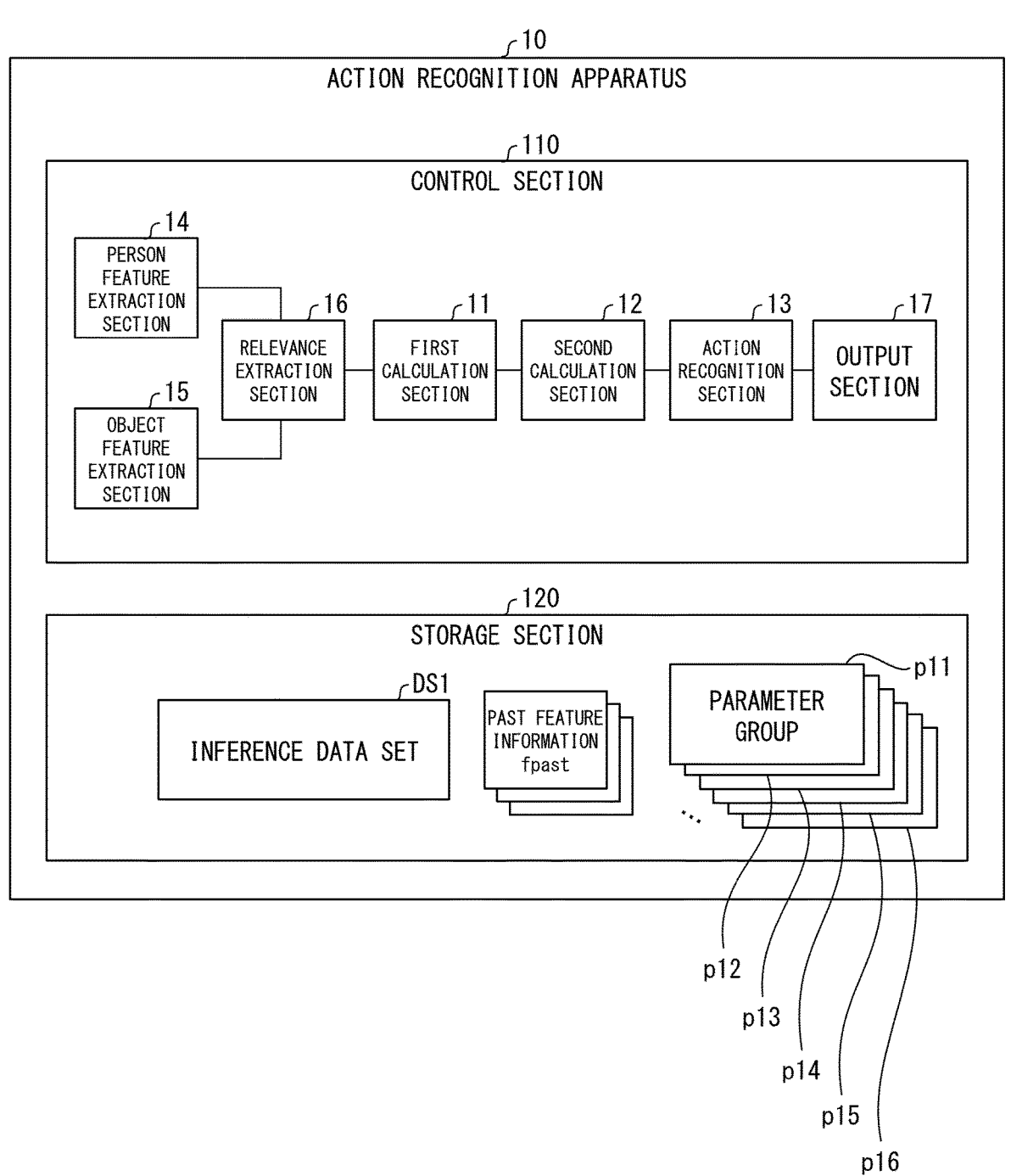
FIG. 5 is a block diagram for describing a configuration of an action recognition apparatus in accordance with a third example embodiment of the present invention.

The following description will discuss a configuration of an action recognition apparatus 10 in accordance with the present example embodiment with reference to FIG. 5. FIG. 5 is a block diagram for describing the configuration of the action recognition apparatus 10. As illustrated in FIG. 5, the action recognition apparatus 10 includes a control section 110 and a storage section 120. The control section 110 comprehensively controls the sections of the action recognition apparatus 10. The control section 110 includes a first calculation section 11, a second calculation section 12, an action recognition section 13, a person feature extraction section 14, an object feature extraction section 15, a relevance extraction section 16, and an output section 17. The storage section 120 stores various kinds of data used by the control section 110. The storage section 120 stores an inference data set DS1, past feature information fpast, and parameter groups p11 through p16.

(Inference Data Set DS1)

Figure 6:
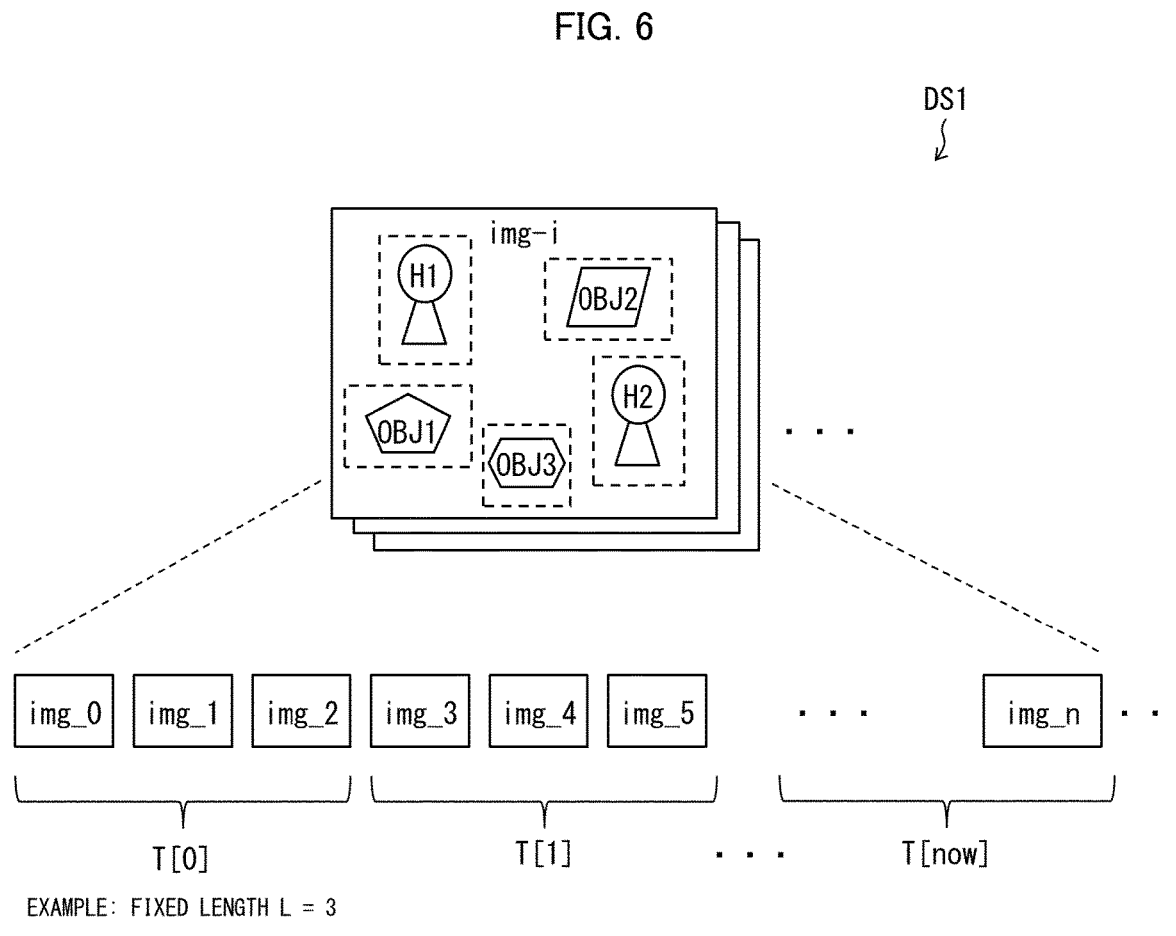

The inference data set DS1 is an image sequence constituting a time series, and is a target of inference. The image sequence may be, for example, an image sequence imaged by an imaging apparatus. The following description will discuss an example of the inference data set DS1 with reference to FIG. 6. FIG. 6 is a schematic diagram illustrating an example of the inference data set DS1. As illustrated in FIG. 6, the inference data set DS1 is a time series including an image img_0, an image img_1, an image img_2, . . . , an image img_now, and so forth. Here, an older image is assigned with a smaller index i of the image img_i (i=0, 1, 2, . . . , n; n is a natural number of 2 or more). In a case where it is not necessary to particularly distinguish between the images img_i, each of those images is sometimes referred to simply as an image img.

The inference data set DS1 includes an image that includes a person H as a subject, and an image that includes an object OBJ as a subject. The number of persons H and the number of objects OBJ included in each image can be zero, can be one, and can be two or more. In descriptions in which a plurality of persons H or a plurality of objects OBJ are distinguished from each other, the persons H are referred to also as persons H1, H2, and so forth, and the objects are referred to also as objects OBJ1, OBJ2, and so forth. In the example illustrated in FIG. 6, the image img_i includes persons H1 and H2 and objects OBJ1 through OBJ3 as subjects. Note that, in a case where a person (or object) included in another image img_k (i≠k) is the same person (or the same object) as the person H1 or the like (or object OBJ1 or the like) included in the image img_i, the person (or object) is also referred to as the person H1 (or object OBJ1) or the like. Each of the persons H and the objects OBJ included in the image img_i does not necessarily need to be included in the other image img_k.

In the inference data set DS1, each of partial sequences T having a fixed length L is a processing unit. The partial sequence is a sequence that constitutes a part of an image sequence. Hereinafter, in descriptions in which different partial sequences T in the inference data set DS1 are distinguished from each other, the partial sequences T may be referred to also as partial sequences T[j] (j=0, 1, 2, and so forth). An older image is assigned with a smaller index j of the partial sequence T[j]. Moreover, the index j is an example of information for identifying a partial sequence T[j]. In the example illustrated in FIG. 6, in a case of, for example, L=3, a partial sequence T[0] is constituted by images img_O through img_2, and a partial sequence T[1] is constituted by images img_3 through img_5. The partial sequences T[j] are to be processed by the control section 110 in order of j=0, 1, 2, and so forth.

A partial sequence T[now] refers to a partial sequence T that is a target of current processing. In this example, the partial sequence T[now] is constituted by images img_(n−2) through img_n. Hereinafter, the partial sequence T[now] is referred to also as a partial sequence Tnow. The partial sequence Tnow is an example of the first partial sequence. Partial sequences T[now−1], T[now−2], and so forth including past images img prior to the partial sequence Tnow are referred to also as partial sequences Tpast. The partial sequence Tpast is an example of the second partial sequence. Note that the fixed length L is not limited to 3, and may be any other value. For example, the fixed length L is predetermined in accordance with a type of an action to be recognized.

FIG. 6 illustrates the example in which partial sequences T[j] (j=0, 1, 2, and so forth) do not overlap with each other. However, the partial sequences T[j] may overlap with each other. In such a case, a partial sequence T[j] only needs to include at least one past image img prior to a partial sequence T[j+1]. For example, a partial sequence T[0] may be constituted by images img0 through img2, and a partial sequence T[1] may be constituted by images img1 through img3.

(Past Feature Information Fpast)

The past feature information fpast is first action feature information fnow which has been calculated for a partial sequence Tpast. Details of the first action feature information fnow will be described later. The storage section 120 stores past feature information fpast for each person H, which is associated with information for identifying a partial sequence Tpast. The information for identifying a partial sequence Tpast is an index j of a partial sequence T[j] that indicates the partial sequence Tpast. In descriptions in which pieces of past feature information fpast are distinguished from each other, each piece of past feature information is referred to also as past feature information f[j,H]. The past feature information f[j,H] indicates past feature information fpast of a person H associated with a partial sequence T[j] (j=now−1, now−2, and so forth).

Figure 7:
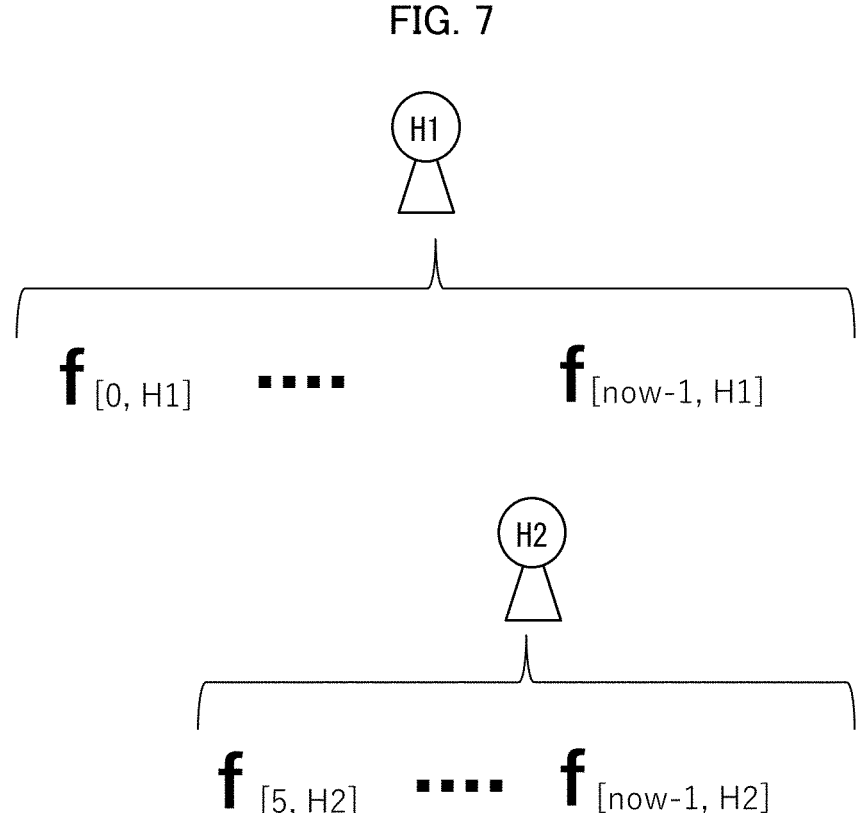
FIG. 7 is a schematic diagram for describing an example of past feature information in the third example embodiment of the present invention.

The following description will discuss an example of past feature information fpast with reference to FIG. 7. FIG. 7 is a schematic diagram for describing an example of past feature information fpast. As illustrated in FIG. 7, the storage section 120 stores, as a plurality of pieces of past feature information fpast, pieces of past feature information f[0,H1], . . . , f[now−1,H1], and pieces of past feature information f[5,H2], . . . , f[now−1,H2]. The past feature information f[0,H1] represents a feature of an action of a person H1 associated with a partial sequence T[0]. The past feature information f[now−1,H1] represents a feature of an action of the person H1 associated with a partial sequence T[now−1]. The past feature information f[5,H2] represents a feature of an action of a person H2 associated with a partial sequence T[5]. Similarly, past feature information f[now−1,H2] represents a feature of an action of the person H2 associated with a partial sequence T[now−1].

(Parameter Groups p11 Through p16)

The parameter group p11 is a learned parameter group that specifies an operation of the first calculation section 11. The parameter group p12 is a learned parameter group that specifies an operation of the second calculation section 12. The parameter group p13 is a learned parameter group that specifies an operation of the action recognition section 13. The parameter group p14 is a learned parameter group that specifies an operation of the person feature extraction section 14. The parameter group p15 is a learned parameter group that specifies an operation of the object feature extraction section 15. The parameter group p16 is a learned parameter group that specifies an operation of the relevance extraction section 16.

(Person Feature Extraction Section 14)

The person feature extraction section 14 detects one or more persons H included in a partial sequence Tnow and extracts person feature information that indicates a feature of each of the persons H. Here, detection of a person H means to detect a region of the person H from each of a plurality of images img included in a partial sequence T, and to assign the same ID to regions of the person H who has been determined to be the same person among the plurality of images img. It is possible to apply a known tracking technique to a detection technique for detecting a person H. Examples of such a tracking technique include, but not limited to, a rectangle-based tracking technique, a pose-based tracking technique, a segmentation-based tracking technique, and the like. Extraction of person feature information means to extract, for each person H, information that indicates a feature of the person H from each of a plurality of images img. It is possible to apply a known technique to an extraction technique for extracting person feature information. Examples of such an extraction technique include, but not limited to, intermediate representation of deep learning, and classical image features (such as SIFT). An operation of the person feature extraction section 14 configured as described above is specified by the learned parameter group p14.

(Object Feature Extraction Section 15)

The object feature extraction section 15 detects one or more objects OBJ included in a partial sequence Tnow and extracts object feature information that indicates a feature of each of the objects OBJ. Here, detection of an object OBJ means to detect a region of the object OBJ from each of a plurality of images img included in a partial sequence Tnow. The object feature extraction section 15 may or may not determine identity of an object between a plurality of images img. In a case where identity of an object is determined, the object feature extraction section 15 assigns the same ID to regions of an object OBJ that has been determined to be the same object among a plurality of images img. It is possible to apply a known technique to a detection technique for detecting an object OBJ. Examples of such a detection technique include, but not limited to, a rectangle-based technique, a key point-based technique, a segmentation-based technique, and the like. Extraction of object feature information means to extract, for each object OBJ, information that indicates a feature of the object OBJ from each of a plurality of images img. It is possible to apply a known technique to an extraction technique for extracting object feature information. Examples of such an extraction technique include, but not limited to, techniques similar to those described for the person feature extraction section 14. An operation of the object feature extraction section 15 configured as described above is specified by the learned parameter group p15.

(Relevance Extraction Section 16)

The relevance extraction section 16 extracts, based on person feature information and object feature information, relevance information that indicates a relevance between a person H and an object OBJ. Specifically, the relevance information can be information that indicates, for each of one or more persons H detected by the person feature extraction section 14, a most relevant object OBJ among one or more objects OBJ detected by the object feature extraction section 15. Note that the relevance information can be extracted in a unit of image img included in a partial sequence Tnow, or can be extracted in a unit of partial sequence Tnow. For example, in a case where identity of an object between a plurality of images img has not been determined, it is preferable that relevance information is extracted in a unit of image img. Among one or more persons H, there may be a person H for whom a most relevant object OBJ is not identified. Such a case may be a situation in which the person H is taking an action without using any object OBJ. In such a case, relevance information indicating that there is no relevant object OBJ is extracted. For a plurality of persons H, the same object OBJ may be extracted as a most relevant object OBJ. Such a case may be a situation in which a plurality of persons H are taking an action using the same object OBJ, or the like. In such a case, for each of the persons H, relevance information that indicates the same object OBJ is extracted. For a single person H, a plurality of objects OBJ may be extracted as a most relevant object OBJ. Such a case may be a situation in which a single person is taking an action using a plurality of objects OBJ, or the like. In such a case, relevance information that indicates the plurality of objects OBJ is extracted for the person H. It is possible to apply a known technique to an extraction technique for extracting relevance information. For example, the relevance extraction section 16 may extract a most relevant object OBJ based on attention information which is extracted using a neural network such as "self attention". Note that a configuration of the relevance extraction section 16 is not limited to the above described configuration. An operation of the relevance extraction section 16 configured as described above is specified by the learned parameter group p16.

(First Calculation Section 11)

The first calculation section 11 calculates first action feature information fnow that indicates a feature of an action of a person H based on a relevance between the person H who is included as a subject in an image included in a partial sequence Tnow and an object OBJ. The first calculation section 11 causes the storage section 120 to store the calculated first action feature information fnow in association with information for identifying the partial sequence Tnow. The first action feature information fnow stored in the storage section 120 is, as past feature information fpast, referred to when a partial sequence T that is newer than the partial sequence Tnow is processed as a new partial sequence Tnow.

Specifically, the first calculation section 11 calculates first action feature information fnow by referring to person feature information and object feature information for a combination of a person H and an object OBJ that is indicated by relevance information. Here, the first action feature information fnow indicates a feature of an action of a person H related to a partial sequence Tnow. Therefore, in descriptions in which persons H pertaining to pieces of first action feature information fnow are distinguished from each other, each piece of first action feature information is referred to also as first action feature information f[now,H]. In a case where a partial sequence Tnow does not include, as a subject, an object OBJ related to a person H (in other words, there is no object OBJ that is indicated by relevance information for the person H), the first calculation section 11 calculates first action feature information fnow based on person feature information.

Figure 8:
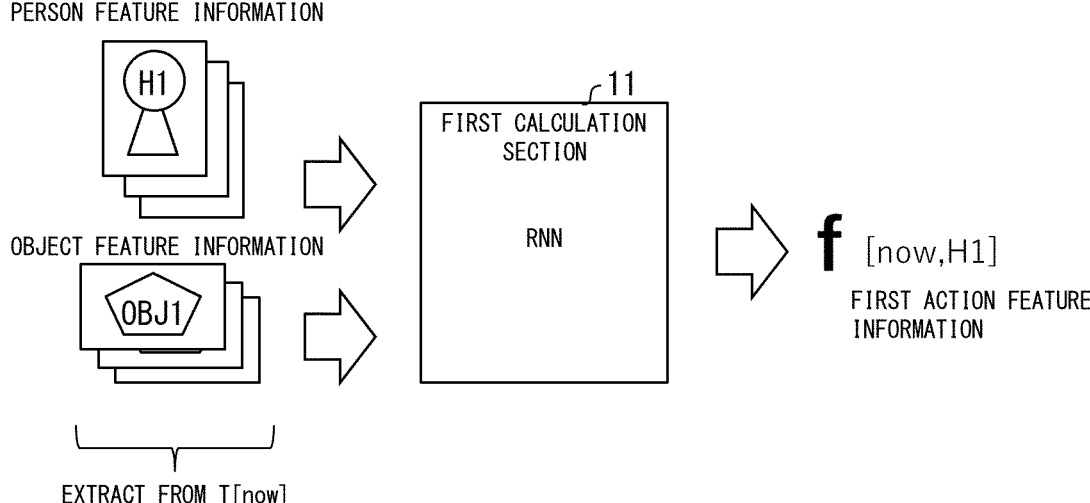
FIG. 8 is a schematic diagram illustrating a specific configuration example of a first calculation section in accordance with the third example embodiment of the present invention.

The following description will discuss a specific example of the first calculation section 11 with reference to FIG. 8. FIG. 8 is a schematic diagram illustrating a specific example of the first calculation section 11. In the example illustrated in FIG. 8, the first calculation section 11 is constituted by a recurrent neural network (RNN). To the first calculation section 11, information is input which is based on a time series of person feature information pertaining to a person H1 extracted from a partial sequence Tnow and a time series of object feature information pertaining to an object OBJ1. For example, in a case where the person feature information and the object feature information are respectively represented as vectors, the input information can be a time series of information obtained by connecting those vectors. The input information may be a time series of information obtained by unifying dimensionality of those vectors and then adding up those vectors. When those pieces of information are input, the first calculation section 11 outputs first action feature information f[now,H1] that indicates a feature of an action of the person H1. Note that a configuration of the first calculation section 11 is not limited to the above-described configuration. An operation of the first calculation section 11 configured as described above is specified by the learned parameter group p11.

(Second Calculation Section 12)

The second calculation section 12 calculates second action feature information Fnow, which is obtained by correcting first action feature information fnow, based on past feature information fpast. Here, the second calculation section 12 refers to, as past feature information fpast, first action feature information fnow which is stored in the storage section 120 and which is associated with information for identifying a partial sequence Tpast. Note that the past feature information fpast which the second calculation section 12 refers to has been calculated in the past for a person H indicated by first action feature information fnow to be corrected. More specifically, the second calculation section 12 calculates, for each of a plurality of pieces of past feature information fpast pertaining to a plurality of partial sequences Tpast which are at least partially different from each other, a weight based on a relevance between that past feature information fpast and first action feature information fnow. The second calculation section 12 calculates second action feature information Fnow, which is obtained by correcting the first action feature information fnow, based on a plurality of pieces of past feature information fpast to which the weights calculated have been respectively given. The second action feature information Fnow is obtained by correcting first action feature information fnow that indicates a feature of an action of a person H related to a partial sequence Tnow. Therefore, in descriptions in which persons H pertaining to pieces of second action feature information Fnow are distinguished from each other, each piece of second action feature information is referred to also as second action feature information F[now,H].

Figure 9:
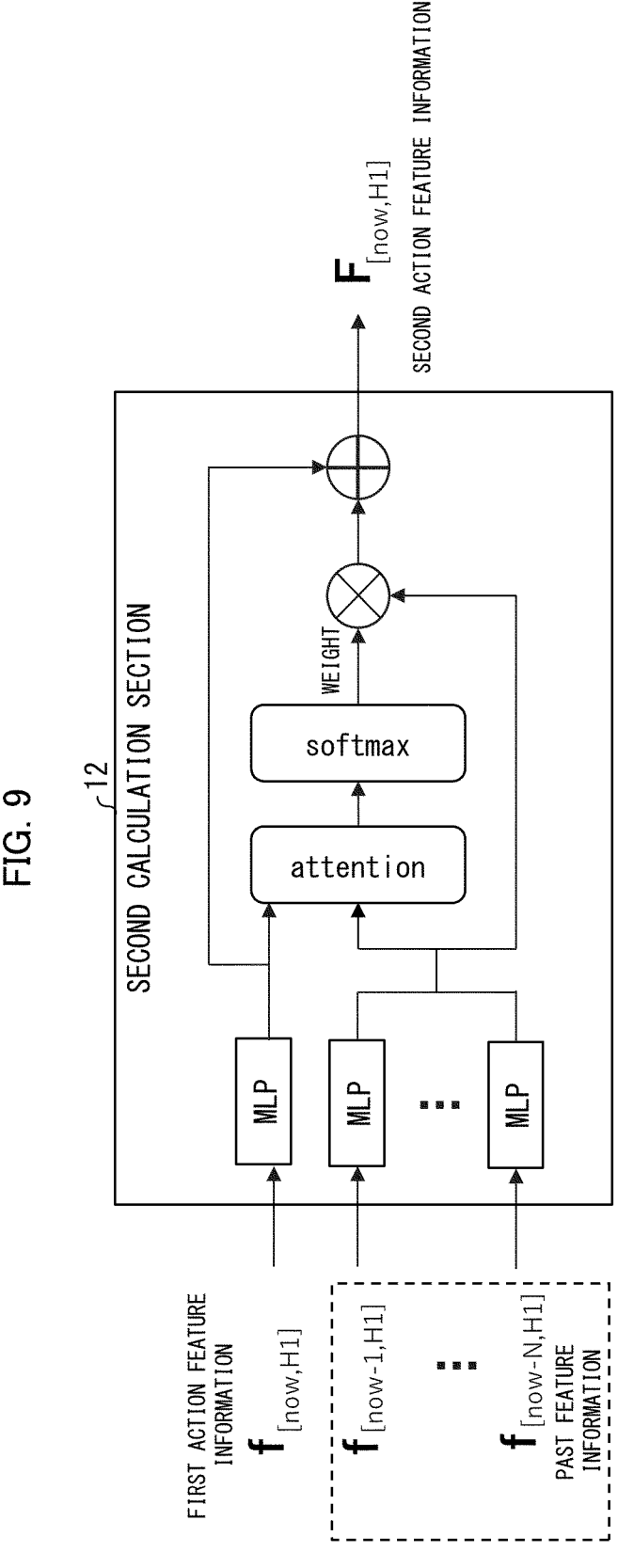
FIG. 9 is a schematic diagram illustrating a specific configuration example of a second calculation section in accordance with the third example embodiment of the present invention.

The following description will discuss a specific example of the second calculation section 12 with reference to FIG. 9. FIG. 9 is a schematic diagram illustrating a specific example of the second calculation section 12. In the example illustrated in FIG. 9, the second calculation section 12 includes a plurality of multilayer perceptrons (MLP) and an attention mechanism. To the second calculation section 12, first action feature information f[now,H1] and pieces of past feature information f[now−1,H1] through f[now−N,H1] are input. Note that N is a predetermined natural number of 2 or more. N is predetermined in accordance with, for example, a type of action to be recognized. The second calculation section 12 inputs the first action feature information f[now, H1] and the pieces of past feature information f[now−1,H1] through f[now−N,H1] to the respective MLPs, and inputs the outputs therefrom to the attention mechanism. Thus, a degree of relevance to the first action feature information f[now,H1] is output from the attention mechanism for each of the pieces of past feature information f[now−1,H1] through f[now−N,H1]. The second calculation section 12 multiplies each of the pieces of past feature information f[now−1,H1] through f[now−N,H1] by a weight that is obtained by normalizing the output by a softmax function. The second calculation section 12 outputs second action feature information Fnow by adding up the pieces of past feature information f[now−1,H1] through f[now−N,H1] obtained by multiplication by the weights, and the first action feature information fnow. Note that a configuration of the second calculation section 12 is not limited to the above-described configuration. An operation of the second calculation section 12 configured as described above is specified by the learned parameter group p12.

Here, it can be said that the degree of relevance output by the attention mechanism represents a temporal dependence between the first action feature information fnow and the past feature information fpast. In the example illustrated in FIG. 9, for example, it is assumed that an action related to the object OBJ1 is continuously carried out by the person H1 in the partial sequences T[now] through T[now−N]. At this time, it is assumed that the object OBJ1 is hidden in the partial sequence T[now] and that the object OBJ1 is not hidden in the partial sequences T[now−1] through T[now−N]. In this case, the first action feature information f[now, H1] may not sufficiently represent a feature of an action of the person H1. However, the past N pieces of past feature information f[now−1,H1] through T[now−N] are more likely to represent a feature of the action of the person H1. Therefore, the first action feature information f[now,H1] is corrected so as to more adequately represent a feature of the action of the person H1 by adding information based on the past N pieces of past feature information f[now−1,H1] through T[now−N]. The second action feature information Fnow obtained by such correction represents, even in a case where an object OBJ related to an action of a person H is hidden in a partial sequence Tnow, a feature of the action of the person H with higher accuracy than the first action feature information fnow.

In some cases, the object OBJ1 is hidden also in any of the partial sequences T[now−1] through T[now−N], for example, in the partial sequence T[now−3]. In this case, a degree of relevance between the first action feature information f[now,H1] and past feature information f[now−3,H1] is lower than degrees of relevance to the other pieces of past feature information f[now−j,H1] (j=1, 2, 4, . . . , N, where j≠3). Therefore, the past feature information f[now−3,H1] is multiplied by a weight smaller than the others. Therefore, influence by the past feature information f[now-3,H1] on the correction is reduced. The second action feature information Fnow obtained by such correction represents, even in a case where an object OBJ related to an action of a person H is hidden in a part of N partial sequences Tpast, a feature of the action of the person H with higher accuracy than the first action feature information fnow.

(Action Recognition Section 13)

The action recognition section 13 recognizes an action of a person H based on second action feature information Fnow. For example, the action recognition section 13 may calculate, while using the second action feature information Fnow as input, a score of each of one or more predetermined action labels, and may output an action label which is selected based on the scores (e.g., an action label with the highest score) as an action recognition result. For example, a known machine learning algorithm can be applied to the action recognition section 13. Examples of such a machine learning algorithm include, but not limited to, random forests, gradient boosting decision trees, neural networks, support vector machines, and the like. An operation of the action recognition section 13 is specified by the learned parameter group p13.

The action recognition section 13 may recognize an action of a person H by further referring to first action feature information fnow in addition to the second action feature information Fnow. Here, the first action feature information fnow and the second action feature information Fnow are both pieces of information that similarly represent a feature of an action of the person H and are in the same form. Therefore, the action recognition section 13 is operable while using the first action feature information fnow as input and using the second action feature information Fnow as input. In such a case, for example, the action recognition section 13 may calculate an average of a score of each action label obtained by inputting the first action feature information fnow and a score of each action label obtained by inputting the second action feature information Fnow, and output an action label having the highest average as an action recognition result. Alternatively, for example, the action recognition section 13 may compare an action label having a highest score obtained by inputting the first action feature information fnow with an action label having a highest score obtained by inputting the second action feature information Fnow, and output an action label having a higher score as an action recognition result. If only the second action feature information Fnow is referred to, there is a case in which influence of past feature information fpast included in the second action feature information Fnow on an action recognition result is excessively large. By further referring to first action feature information fnow, it is possible to recognize an action with higher accuracy.

(Output Section 17)

The output section 17 determines and outputs an action label of a person H based on a time series of action recognition results of the person H output from the action recognition section 13. In a case where a plurality of persons H are included as subjects in the inference data set DS1, the output section 17 determines and outputs an action label for each of the persons H.

Here, the action recognition section 13 sequentially outputs action recognition results pertaining to partial sequences T[0], T[1], and so forth for the person H. In other words, a time series of action labels that are action recognition results for the person H is output from the action recognition section 13. For example, the output section 17 may decide an action label having a highest score among such a time series of action labels. Alternatively, for example, the output section 17 may decide an action label having a highest total score among such a time series of action labels. Alternatively, for example, the output section 17 may decide an action label the number of which is largest among such a time series of action labels.

(Flow of Action Recognition Method S10)

Figure 10:
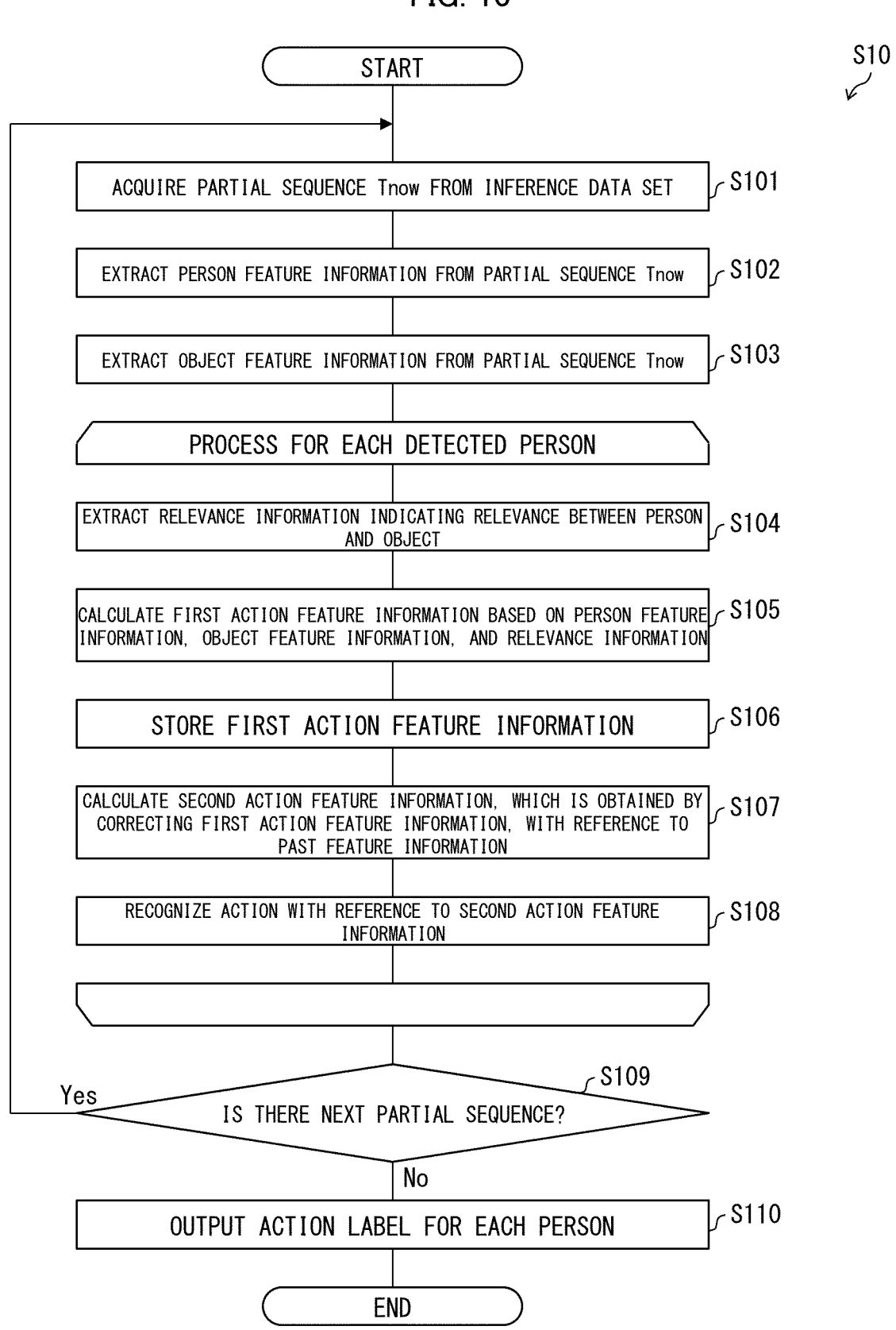
FIG. 10 is a flowchart for describing a flow of an action recognition method in accordance with the third example embodiment of the present invention.

The action recognition apparatus 10 configured as described above carries out an action recognition method S10 in accordance with the present example embodiment. The following description will discuss the action recognition method S10 with reference to FIG. 10. FIG. 10 is a flowchart for describing a flow of the action recognition method S10. As illustrated in FIG. 10, the action recognition method S10 includes steps S101 through S110.

In step S101, the control section 110 acquires a partial sequence Tnow from the inference data set DS1. In step S102, the person feature extraction section 14 detects one or more persons H from the partial sequence Tnow and extracts person feature information that indicates a feature of each of the persons H. In step S103, the object feature extraction section 15 detects one or more objects OBJ from the partial sequence Tnow and extracts object feature information that indicates a feature of each of the objects OBJ. Note that the steps S102 and S103 may be carried out in a different order or in parallel. Specific examples of detection techniques for detecting a person H and an object OBJ and extraction techniques for extracting person feature information and object feature information are as described above.

Next, the control section 110 repeats steps S104 through S108 for each person H detected in step S102. In step S104, the relevance extraction section 16 extracts relevance information that indicates an object OBJ that is most relevant to the person H based on person feature information and object feature information. A specific example of the extraction technique for extracting relevance information is as described above.

In step S105, the first calculation section 11 calculates first action feature information fnow by referring to person feature information of the person H and object feature information of the object OBJ indicated by the relevance information. In a case where there is no object OBJ that is indicated by the relevance information for the person H, the first calculation section 11 calculates first action feature information fnow by referring to person feature information of the person H. A specific example of the calculation technique for calculating first action feature information fnow is as described above in the specific example of the first calculation section 11 illustrated in FIG. 8. In step S106, the first calculation section 11 causes the storage section 120 to store the calculated first action feature information fnow.

In step S107, the second calculation section 12 calculates second action feature information Fnow, which is obtained by correcting the first action feature information fnow, with reference to past feature information fpast stored in the storage section 120. A specific example of the calculation technique for calculating second action feature information Fnow is as described above in the specific example of the second calculation section 12 illustrated in FIG. 9.

In step S108, the action recognition section 13 recognizes an action of the person H with reference to the second action feature information. As described above, the action recognition section 13 may further refer to the first action feature information fnow to recognize an action of the person H. A specific example of the recognition technique for recognizing an action is as described above.

Upon completion of the processes of steps S104 through S108 for each person H, the control section 110 carries out step S109. In step S109, the control section 110 determines whether or not there is a partial sequence T that is newer than the partial sequence Tnow in the inference data set DS1. In a case where it has been determined to be Yes in step S109, the control section 110 repeats the processes from step S101 while setting the new partial sequence T to be a new partial sequence Tnow.

In a case where it has been determined to be No in step S109, the control section 110 carries out step S110. In step S110, the output section 17 determines and outputs, for each person H, an action label of the person H based on a time series of action recognition results of the person H output from the action recognition section 13.

(Example Advantage of Present Example Embodiment)

The present example embodiment employs, in addition to the configuration similar to the first example embodiment, the configuration in which: the inference data set DS1 (image sequence) includes an image that includes an object OBJ as a subject; and the first calculation section 11 calculates first action feature information fnow based on a relevance between a person H included as a subject in an image included in a partial sequence Tnow and an object OBJ. According to the above configuration, even in a case where there is a time zone in which an object OBJ related to an action of the person H is not sufficiently shown in an image sequence (e.g., a part of or a whole of the object OBJ is hidden behind the person H, another person H, or another object OBJ), it is possible to recognize an action of the person H with higher accuracy.

The present example embodiment employs, in addition to the above configuration, the configuration in which: the first calculation section 11 causes the storage section 120 to store first action feature information fnow in association with information for identifying a partial sequence Tnow; and the second calculation section 12 refers to, as past feature information fpast, first action feature information fnow which is stored in the storage section 120 and which is associated with information for identifying a partial sequence Tpast. According to the above configuration, a feature of a past action that is indicated by the past feature information fpast, which is first action feature information fnow calculated in the past, is further taking into consideration. Therefore, it is possible to recognize an action of the person H with higher accuracy.

The present example embodiment employs, in addition to the above configuration, the configuration in which: the second calculation section 12 calculates, for each of a plurality of pieces of past feature information fpast pertaining to a plurality of partial sequences Tpast which are at least partially different from each other, a weight based on a relevance between that past feature information fpast and first action feature information fnow, and the second calculation section 12 calculates second action feature information Fnow, which is obtained by correcting the first action feature information fnow, based on a plurality of pieces of past feature information fpast to which the weights calculated have been respectively given. According to the above configuration, in a case where there is a time zone in which an object OBJ related to an action of the person H is hidden in a past time zone, it is possible to reduce influence on an action recognition result of past feature information fpast corresponding to such a time zone.

The present example embodiment employs, in addition to the above configuration, the configuration in which: the action recognition section 13 recognizes an action of a person H by further referring to the first action feature information fnow in addition to the second action feature information Fnow. According to the above configuration, as compared with a case where only the second action feature information Fnow is referred to, it is possible to reduce a possibility that influence of past feature information fpast included in the second action feature information Fnow on an action recognition result is excessively large, and it is thus possible to recognize the action with higher accuracy.

Fourth Example Embodiment

The following description will discuss a fourth example embodiment of the present invention in detail with reference to the drawings. The same reference numerals are given to constituent elements which have functions identical with those described in the first through third example embodiments, and descriptions as to such constituent elements are omitted as appropriate.

(Configuration of Training Apparatus 20)

Figure 11:
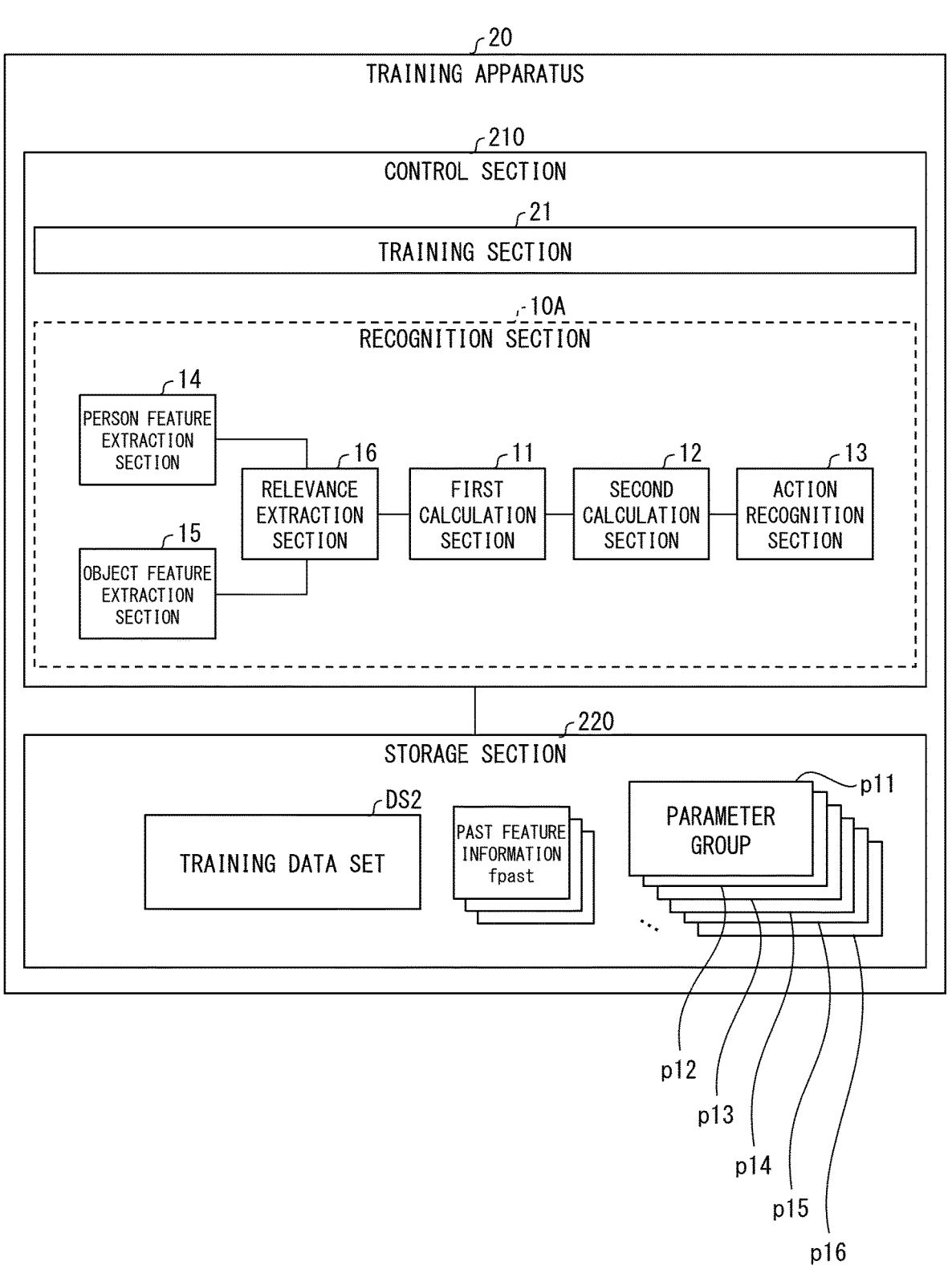
FIG. 11 is a block diagram for describing a configuration of a training apparatus in accordance with a fourth example embodiment of the present invention.

A training apparatus 20 in accordance with the present example embodiment is an apparatus that carries out training of the action recognition apparatus 10 in accordance with the third example embodiment. The following description will discuss a configuration of the training apparatus 20 with reference to FIG. 11. FIG. 11 is a block diagram for describing the configuration of the training apparatus 20. As illustrated in FIG. 11, the training apparatus 20 includes a control section 210 and a storage section 220. The control section 210 comprehensively controls the sections of the training apparatus 20. The control section 210 includes a training section 21 and a recognition section 10A. The storage section 220 stores various kinds of data used by the control section 210. The storage section 220 stores a training data set DS2, past feature information fpast, and parameter groups p11 through p16.

(Training Data Set DS2)

In the training data set DS2, an image sequence constituting a time series is associated with action information (action label) that indicates an action of a person H who is included as a subject in an image included in the image sequence. Each of images included in the image sequence includes one or both of a person H and an object OBJ as a subject(s). As the action label, any one of a plurality of predetermined action labels is associated. In a case where a plurality of persons H are included in the image sequence included in the training data set DS2, an action label is associated with each of the persons H. The image sequence included in the training data set DS2 is described similarly to the inference data set DS1 described with reference to FIG. 6. Therefore, a detailed description thereof is not repeated.

(Recognition Section 10A)

The recognition section 10A includes all functional blocks other than the output section 17, among the functional blocks included in the control section 110 of the action recognition apparatus 10 in accordance with the third example embodiment. Specifically, the recognition section 10A includes a first calculation section 11, a second calculation section 12, an action recognition section 13, a person feature extraction section 14, an object feature extraction section 15, and a relevance extraction section 16. Details of these functional blocks are described similarly to the third example embodiment. Therefore, detailed descriptions thereof are not repeated.

(Training Section 21)

The training section 21 trains the recognition section 10A using the training data set DS2. Specifically, the training section 21 trains the recognition section 10A based on a loss that is obtained by inputting first action feature information fnow into the action recognition section 13, and on a loss that is obtained by inputting second action feature information Fnow into the action recognition section 13. For example, the training section 21 defines a loss function as shown in the following equation (1).

$$\text{Loss function} = L \text{ first action feature information} + L \text{ second action feature information} \qquad (1)$$

Here, the L first action feature information represents a loss that is calculated based on an action recognition result of a person H obtained by inputting first action feature information fnow into the action recognition section 13 and an action label associated with the person H in the training data set DS2. The L second action feature information represents a loss that is calculated based on an action recognition result of a person H obtained by inputting second action feature information Fnow into the action recognition section 13 and an action label associated with the person H in the training data set DS2. Note that the loss function can be, but not limited to, softmax cross entropy. The training section 21 decides the parameter groups p11 through p16 by training the recognition section 10A so that such a loss function is made smaller, and causes the storage section 220 to store the parameter groups p11 through p16.

(Flow of Training Method S20)

Figure 12:
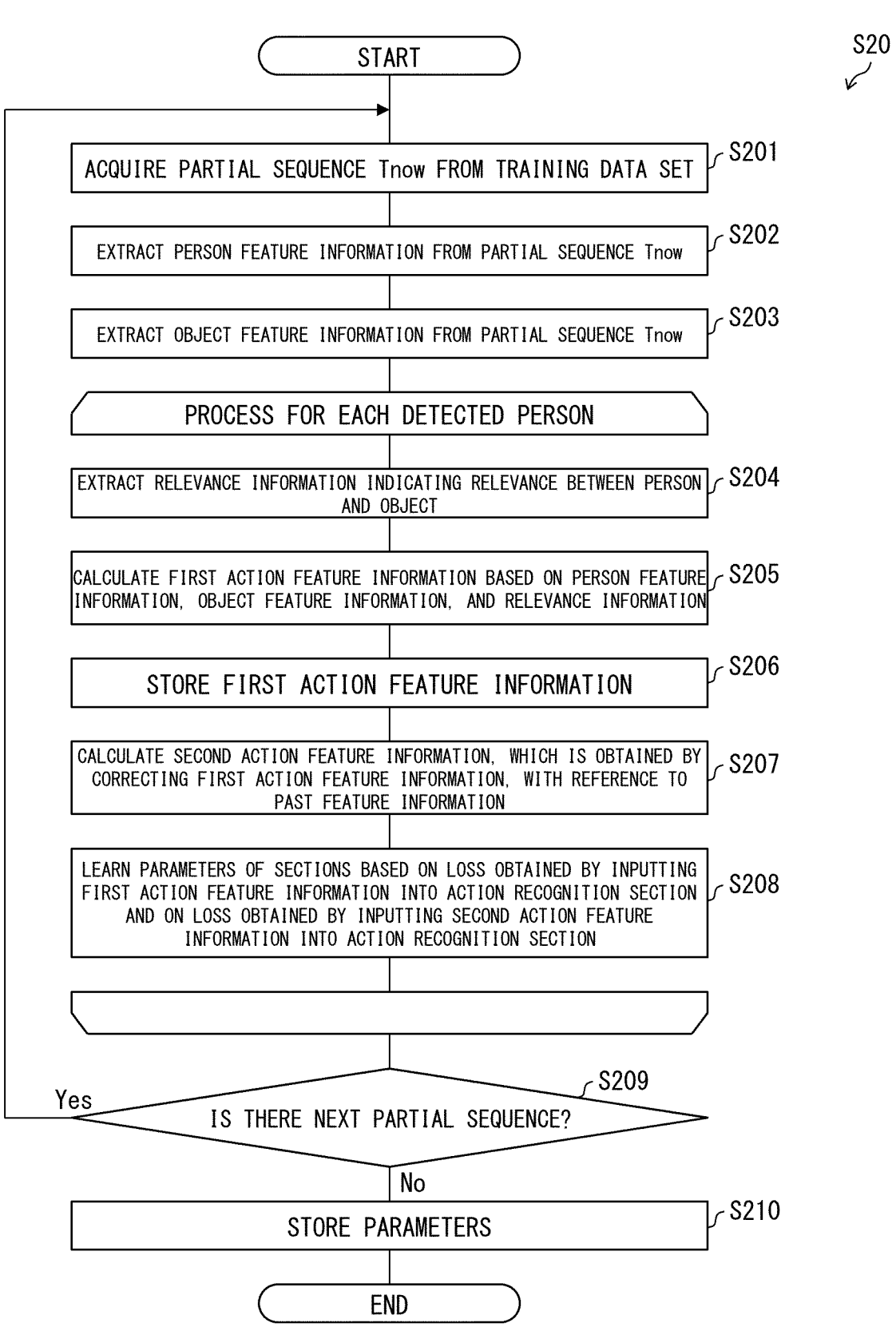
FIG. 12 is a flowchart for describing a flow of a training method in accordance with the fourth example embodiment of the present invention.

The training apparatus 20 configured as described above carries out the training method S20 in accordance with the present example embodiment. The following description will discuss the training method S20 with reference to FIG. 12. FIG. 12 is a flowchart for describing a flow of the training method S20. As illustrated in FIG. 12, the training method S20 includes steps S201 through S210.

Steps S201 through S207 are similarly described by, in the descriptions for steps S101 through S107 in the action recognition method S10, replacing the control section 110 with the control section 210 and replacing the inference data set DS1 with the training data set DS2.

In step S208, the training section 21 trains the sections of the recognition section 10A based on a loss that is obtained by inputting first action feature information fnow into the action recognition section 13, and on a loss that is obtained by inputting second action feature information Fnow into the action recognition section 13.

Upon completion of the processes of steps S204 through S208 for each person H, the control section 210 carries out step S209. In step S209, the control section 210 determines whether or not there is a partial sequence T that is newer than the partial sequence Tnow in the training data set DS2. In a case where it has been determined to be Yes in step S209, the control section 210 repeats the processes from step S201 while setting the new partial sequence T to be a new partial sequence Tnow.

In a case where it has been determined to be No in step S209, the control section 210 carries out step S210. In step S210, the training section 21 causes the storage section 220 to store the parameter groups p11 through p16.

For example, the control section 210 may transmit the parameter groups p11 through p16 thus stored to the action recognition apparatus 10 in accordance with the third example embodiment so that the parameter groups p11 through p16 are stored in the storage section 120. Thus, the training apparatus 20 can train the action recognition apparatus 10. Note that, instead of including the recognition section 10A, the training apparatus 20 may be communicably connected to the action recognition apparatus 10 to train the action recognition apparatus 10.

(Example Advantage of Present Example Embodiment)

As described above, the present example embodiment employs, in addition to a configuration similar to that of the second example embodiment, the configuration in which the training section 21 trains the action recognition apparatus based on a loss that is obtained by inputting first action feature information fnow into the action recognition section 13, and on a loss that is obtained by inputting second action feature information Fnow into the action recognition section 13. According to the above configuration, it is possible to bring about an example advantage of reducing overlearning in which elements of past feature information fpast included in second action feature information Fnow are emphasized.

[Variation]

In the above third and fourth example embodiments, the example has been described in which first action feature information fnow which is associated with information for identifying a partial sequence Tpast is applied as past feature information fpast. The present invention is not limited to this example, and it is possible to apply, as past feature information fpast, relevant feature information associated with information for identifying a partial sequence Tpast. The relevant feature information is information that has been referred to for calculating first action feature information fnow. As such relevant feature information, it is possible to apply object feature information of an object OBJ which has a highest relevance to a person H and which is detected from a partial sequence Tnow. Such object feature information of an object OBJ can be indicated by relevance information extracted by the relevance extraction section 16.

In this case, the first calculation section 11 causes the storage section 120 to store, in association with information for identifying the partial sequence Tnow, relevant feature information which has been referred to for calculating the first action feature information fnow. Moreover, the second calculation section 12 refers to, as past feature information fpast, relevant feature information which is stored in the storage section 120 and which is associated with information for identifying a partial sequence Tpast.

According to the configuration thus modified, relevant feature information which has been referred to for calculating first action feature information fnow of a person H in the past (e.g., object feature information which is most relevant to the person H in the past) is taken into consideration. Therefore, it is possible to recognize an action of the person H with higher accuracy.

In the above-described third example embodiment, images img can be added in real time to the end of the image sequence as the inference data set DS1. In this case, the action recognition apparatus 10 can operate, while targeting a partial sequence Tnow including the latest image img, until a new image img is no longer added. Thus, the action recognition apparatus 10 can recognize, in real time, an action of a person H included in the inference data set DS1 which is input in real time.

(Use Case)

Figure 13:
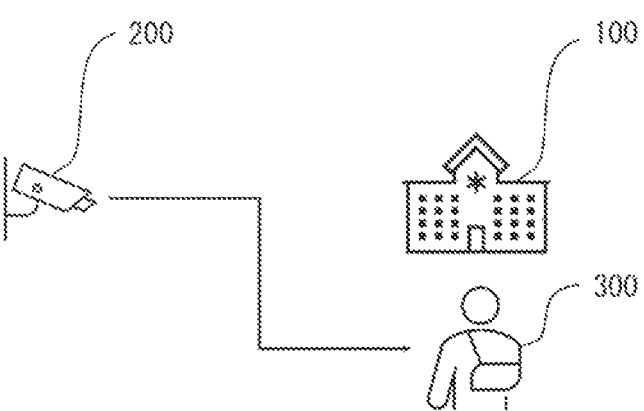
FIG. 13 is a diagram illustrating an example in which the action recognition apparatus in accordance with the present disclosure is applied to the medical and healthcare field.

FIG. 13 is a diagram illustrating an example in which the action recognition apparatus (1, 10) is applied to the medical and healthcare field. In the present use case, the action recognition apparatus (1, 10) recognizes an action of a subject who is in a medical facility such as a hospital, and outputs an alert based on a recognition result. In FIG. 13, a system in accordance with the present example application is a video monitoring system for the purpose of ensuring safety of persons who move in a hospital 100. In the present system, the action recognition apparatus (1, 10) acquires an RGB image from an imaging apparatus 200 installed in the hospital. The action recognition apparatus (1, 10) detects a dangerous action of a person 300 such as a patient, a hospital staff (including a health professional), a visitor, or the like from a video acquired from the imaging apparatus 200 installed in the hospital, and outputs an alert. Furthermore, in the present system, the action recognition apparatus (1, 10) provides a health professional or the like with an appropriate countermeasure based on the detected dangerous action.

A specific flow of the present use case will be described below. The following description will discuss, in order, the following flow including processes in which: (1) the inside of the hospital 100 is imaged by the imaging apparatus 200; (2) a video taken by the imaging apparatus 200 is acquired, and risk estimation is carried out; and (3) a hospital staff checks for an abnormality and deals with the abnormality.

((1) Imaging Inside Hospital with Imaging Apparatus)

First, the inside of the hospital 100 is imaged by the imaging apparatus 200. Imaging apparatuses 200 are installed in rooms, corridors, elevators, and the like in the hospital 100 so that videos in the hospital 100 can be acquired.

((2) Acquiring Video Taken by Imaging Apparatus and Carrying Out Risk Estimation)

The action recognition apparatus (1, 10) acquires a video taken by the imaging apparatus 200, recognizes an action of the person 300 by the action recognition method described above, and carries out risk estimation in relation to the action of the person 300. At this time, in a case where it is determined that there is a risk in the action of the person 300, the action recognition apparatus (1, 10) transmits an alert to a hospital staff or the like. Specifically, for example, the action recognition apparatus (1, 10) may transmit an alert to a terminal owned by a hospital staff via a network. Alternatively, the action recognition apparatus (1, 10) may cause an output apparatus (e.g., a display, a speaker, or the like) to output an alert.

In the present use case, subjects of action recognition include, for example, a patient, a medical staff (including a health professional), a visitor, and the like. Objects existing around a subject include, for example, medical instruments, a drip, a wagon, a wheelchair, and the like.

Examples of the case in which it is determined that there is a risk include cases in which: a patient is about to touch a specific medical instrument; a patient who is moving along with a drip and a visitor who is maneuvering a wheelchair are about to collide with each other; a person holding a white cane and a person who is moving along with a drip are about to collide with each other; and the like. The action recognition apparatus (1, 10) determines whether or not there is a risk in the recognized action by, for example, referring to a table that stores an action of a person in association with information indicating whether or not there is a risk in the action. Note, however, that a determination method for determining whether or not there is a risk is not limited to the above-described example. The action recognition apparatus (1, 10) may determine whether or not there is a risk by, for example, inputting information such as a recognized action into a learned model which has been trained, by machine learning, to output information that indicates whether or not there is a risk while using, as input, an action of a person, a situation of an environment, and the like.

The action recognition apparatus (1, 10) may carry out estimation of whether or not there is a risk based on a video acquired in real time and issue an alert. Alternatively, the action recognition apparatus (1, 10) may carry out estimation of whether or not there is a risk collectively based on accumulated videos and output the result as a report.

((3) Hospital Staff Checks for and Deals with Abnormality)

A hospital staff who has received the alert takes an appropriate countermeasure. Examples of the countermeasure include: rushing to a place where an abnormality is occurring; providing appropriate care to a patient; changing an arrangement of a medical apparatus; and the like.

At this time, the action recognition apparatus (1, 10) may decide and present a countermeasure that is to be proposed to the hospital staff. In this case, for example, the action recognition apparatus (1, 10) decides, based on the content and degree of the estimated risk, a countermeasure based on a predetermined rule. Alternatively, the action recognition apparatus (1, 10) may estimate, based on the content and degree of the estimated risk, a countermeasure using a machine learning model which has been trained by machine learning in advance.

The action recognition apparatus (1, 10) may issue an alert only to a corresponding subject among a plurality of hospital staffs, or may issue an alert by controlling a broadcast apparatus in the hospital. The action recognition apparatus (1, 10) may generate a message to a subject and notify a terminal owned by the subject with the message.

(Example Advantage of Use Case)

According to the action recognition apparatus (1, 10) in accordance with the present use case, it is possible to improve safety ensuring for patients in the hospital 100 and to reduce loads of the hospital staffs. According to the action recognition apparatus (1, 10) in accordance with the present use case, it is possible to detect an abnormal action using the action recognition technique, and it is thus possible to quickly detect an abnormality as compared with conventional manual monitoring. As a result, it is possible to prevent accidents and troubles before occurrence thereof.

According to the action recognition apparatus (1, 10) in accordance with the present use case, it is possible to optimize an action of a hospital staff by presenting a countermeasure. It is also possible to support decision making of a hospital staff by presenting a countermeasure.

Furthermore, according to the action recognition apparatus (1, 10) in accordance with the present use case, it is possible to develop a more advanced abnormality detection algorithm and to predict abnormality occurrence by accumulating and analyzing data.

Software Implementation Example

The functions of part of or all of the action recognition apparatuses 1 and 10 and the training apparatuses 2 and 20 (hereinafter referred to as each apparatus) can be realized by hardware such as an integrated circuit (IC chip) or can be alternatively realized by software.

Figure 14:
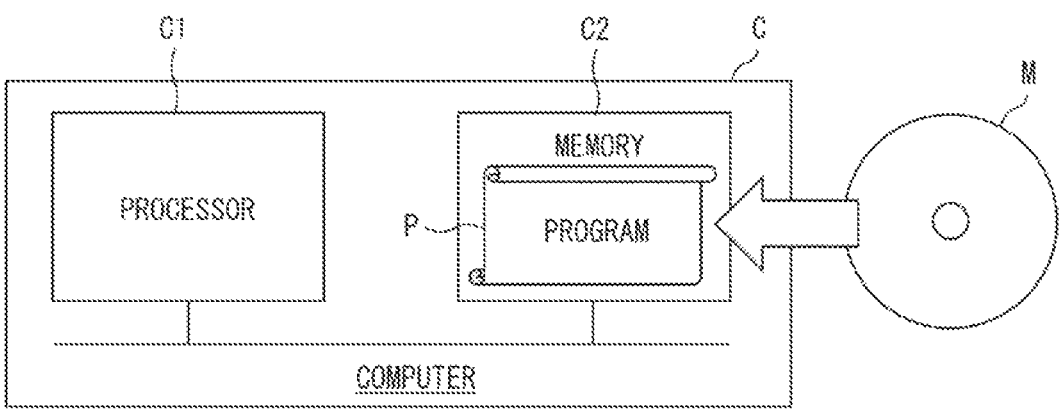
FIG. 14 is a block diagram illustrating a hardware configuration example of each apparatus included in each of the example embodiments of the present invention.

In the latter case, the each apparatus is realized by, for example, a computer that executes instructions of a program that is software realizing the foregoing functions. FIG. 14 illustrates an example of such a computer (hereinafter, referred to as "computer C"). The computer C includes at least one processor C1 and at least one memory C2. The memory C2 stores a program P for causing the computer C to function as the each apparatus. In the computer C, the processor C1 reads the program P from the memory C2 and executes the program P, so that the functions of the each apparatus are realized.

As the processor C1, for example, it is possible to use a central processing unit (CPU), a graphic processing unit (GPU), a digital signal processor (DSP), a micro processing unit (MPU), a floating point number processing unit (FPU), a physics processing unit (PPU), a tensor processing unit (TPU), a quantum processor, a microcontroller, or a combination of these. Examples of the memory C2 include a flash memory, a hard disk drive (HDD), a solid state drive (SSD), and a combination thereof.

Note that the computer C can further include a random access memory (RAM) in which the program P is loaded when the program P is executed and in which various kinds of data are temporarily stored. The computer C can further include a communication interface for carrying out transmission and reception of data with other apparatuses. The computer C can further include an input-output interface for connecting input-output apparatuses such as a keyboard, a mouse, a display and a printer.

The program P can be stored in a non-transitory tangible storage medium M which is readable by the computer C. Examples of such a storage medium M can include a tape, a disk, a card, a semiconductor memory, and a programmable logic circuit. The computer C can obtain the program P via the storage medium M. Alternatively, the program P can be transmitted via a transmission medium. Examples of such a transmission medium can include a communication network and a broadcast wave. The computer C can obtain the program P also via such a transmission medium.

[Additional Remark 1]

The present invention is not limited to the foregoing example embodiments, but may be altered in various ways by a skilled person within the scope of the claims. For example, the present invention also encompasses, in its technical scope, any example embodiment derived by appropriately combining technical means disclosed in the foregoing example embodiments.

[Additional Remark 2]

Some or all of the foregoing example embodiments can also be described as below. Note, however, that the present invention is not limited to the following supplementary notes.

(Supplementary Note 1)

An action recognition apparatus, including: a first calculation means for calculating, based on a first partial sequence in an image sequence constituting a time series, first action feature information that indicates a feature of an action of a person who is included as a subject in an image included in the first partial sequence; a second calculation means for calculating, based on past feature information, second action feature information obtained by correcting the first action feature information, the past feature information having been calculated based on a second partial sequence including at least one past image which is prior to the first partial sequence in the image sequence; and an action recognition means for recognizing an action of the person based on the second action feature information.

(Supplementary Note 2)

The action recognition apparatus according to supplementary note 1, in which: the image sequence includes an image that includes an object as a subject; and the first calculation means calculates the first action feature information based on a relevance between the person who is included as a subject in the image included in the first partial sequence and the object.

(Supplementary Note 3)

The action recognition apparatus according to supplementary note 1 or 2, in which: the first calculation means causes a storage apparatus to store, in association with information for identifying the first partial sequence, the first action feature information or relevant feature information which has been referred to for calculating the first action feature information; and the second calculation means refers to, as the past feature information, the first action feature information or the relevant feature information which is stored in the storage apparatus and which is associated with information for identifying the second partial sequence.

(Supplementary Note 4)

The action recognition apparatus according to any one of supplementary notes 1 through 3, in which: the second calculation means calculates, for each of a plurality of pieces of past feature information pertaining to a plurality of second partial sequences which are at least partially different from each other, a weight based on a relevance between that past feature information and the first action feature information, and the second calculation means calculates the second action feature information, which is obtained by correcting the first action feature information, based on the plurality of pieces of past feature information to which the weights calculated have been respectively given.

(Supplementary Note 5)

The action recognition apparatus according to any one of supplementary notes 1 through 4, in which: the action recognition means recognizes an action of the person by further referring to the first action feature information, in addition to the second action feature information.

(Supplementary Note 6)

The action recognition apparatus according to any one of supplementary notes 1 through 5, in which: the action recognition means recognizes an action of the person with use of a learned model which has been trained by machine learning.

(Supplementary Note 7)

The action recognition apparatus according to any one of supplementary notes 1 through 6, in which: the action recognition means recognizes an action of a subject who is in a medical facility, and outputs an alert based on a recognition result.

(Supplementary Note 8)

The action recognition apparatus according to any one of supplementary notes 1 through 7, in which: the action recognition means recognizes an action of a subject who is in a medical facility, and outputs information for supporting decision making of a health professional based on a recognition result.

(Supplementary Note 9)

A training apparatus including: a training means for training an action recognition apparatus described in any one of supplementary notes 1 through 5 with use of a training data set in which an image sequence constituting a time series is associated with action information that indicates an action of a person who is included as a subject in an image included in the image sequence.

(Supplementary Note 10)

The training apparatus according to supplementary note 9, in which: the training means trains the action recognition apparatus based on a loss that is obtained by inputting the first action feature information into the action recognition means, and on a loss that is obtained by inputting the second action feature information into the action recognition means.

(Supplementary Note 11)

An action recognition method, including: calculating, by a computer based on a first partial sequence in an image sequence constituting a time series, first action feature information that indicates a feature of an action of a person who is included as a subject in an image included in the first partial sequence; calculating, by the computer based on past feature information, second action feature information obtained by correcting the first action feature information, the past feature information having been calculated based on a second partial sequence including at least one past image which is prior to the first partial sequence in the image sequence; and recognizing, by the computer, an action of the person based on the second action feature information.

(Supplementary Note 12)

A training method comprising: training, by a computer, an action recognition apparatus described in any one of supplementary notes 1 through 5 with use of a training data set in which an image sequence constituting a time series is associated with action information that indicates an action of a person who is included as a subject in an image included in the image sequence.

(Supplementary Note 13)

A program for causing a computer to function as: a first calculation means for calculating, based on a first partial sequence in an image sequence constituting a time series, first action feature information that indicates a feature of an action of a person who is included as a subject in an image included in the first partial sequence; a second calculation means for calculating, based on past feature information, second action feature information obtained by correcting the first action feature information, the past feature information having been calculated based on a second partial sequence including at least one past image which is prior to the first partial sequence in the image sequence; and an action recognition means for recognizing an action of the person based on the second action feature information.

(Supplementary Note 14)

A program for causing a computer to function as: a training means for training an action recognition apparatus described in any one of supplementary notes 1 through 8 with use of a training data set in which an image sequence constituting a time series is associated with action information that indicates an action of a person who is included as a subject in an image included in the image sequence.

(Supplementary Note 15)

An action recognition apparatus, including at least one processor, the at least one processor carrying out: a first calculation process of calculating, based on a first partial sequence in an image sequence constituting a time series, first action feature information that indicates a feature of an action of a person who is included as a subject in an image included in the first partial sequence; a second calculation process of calculating, based on past feature information, second action feature information obtained by correcting the first action feature information, the past feature information having been calculated based on a second partial sequence including at least one past image which is prior to the first partial sequence in the image sequence; and an action recognition process of recognizing an action of the person based on the second action feature information.

Note that the action recognition apparatus can further include a memory. The memory can store a program for causing the at least one processor to carry out the first calculation process, the second calculation process, and the action recognition process. The program can be stored in a computer-readable non-transitory tangible storage medium. (Supplementary Note 16)

A training apparatus including at least one processor, the at least one processor carrying out: a training process of training an action recognition apparatus described in supplementary note 15 with use of a training data set in which an image sequence constituting a time series is associated with action information that indicates an action of a person who is included as a subject in an image included in the image sequence.

Note that the training apparatus can further include a memory. In the memory, a program for causing the at least one processor to execute the training process can be stored. The program can be stored in a computer-readable non-transitory tangible storage medium.

REFERENCE SIGNS LIST 1, 10: Action recognition apparatus
2, 20: Training apparatus
10A: Recognition section
11, 21: Training section
11: First calculation section
12: Second calculation section
13: Action recognition section
14: Person feature extraction section
15: Object feature extraction section
16: Relevance extraction section
17: Output section
110, 210: Control section
120, 220: Storage section
C1: Processor
C2: Memory

The invention claimed is:

1. An action recognition apparatus, comprising at least one processor, the at least one processor carrying out:

a first calculation process of calculating, based on a first partial sequence in an image sequence constituting a time series, first action feature information that indicates a feature of an action of a person who is included as a subject in an image included in the first partial sequence;

a second calculation process of calculating, based on past feature information, second action feature information obtained by correcting the first action feature information, the past feature information having been calculated based on a plurality of second partial sequences including at least one past image which is prior to the first partial sequence in the image sequence; and an action recognition process of recognizing an action of the person based on the second action feature information, wherein in the first calculation process, the at least one processor stores, in association with information identifying a partial sequence, the first action feature information, and in the second calculation process, the at least one processor:

obtains, as the past feature information, a plurality of pieces of first action feature information previously calculated for the person based on a plurality of second partial sequences, calculates, for each of the plurality of pieces of past feature information, a weight derived from a relevance between that past feature information and the first action feature information, the relevance representing a temporal dependence, and calculates the second action feature information by combining the first action feature information with an aggregate of the plurality of pieces of past feature information weighted by the calculated weights.

2. The action recognition apparatus according to claim 1, wherein:

the image sequence includes an image that includes an object as a subject; and in the first calculation process, the at least one processor calculates the first action feature information based on a relevance between the person who is included as a subject in the image included in the first partial sequence and the object.

3. The action recognition apparatus according to claim 1, wherein:

in the action recognition process, the at least one processor recognizes an action of the person by further referring to the first action feature information, in addition to the second action feature information.

4. The action recognition apparatus according to claim 1, wherein:

in the action recognition process, the at least one processor recognizes an action of the person with use of a learned model which has been trained by machine learning.

5. The action recognition apparatus according to claim 1, wherein:

in the action recognition process, the at least one processor recognizes an action of a subject who is in a medical facility, and outputs an alert based on a recognition result.

6. The action recognition apparatus according to claim 1, wherein:

in the action recognition process, the at least one processor recognizes an action of a subject who is in a medical facility, and outputs information for supporting decision making of a health professional based on a recognition result.

7. A training apparatus comprising at least one processor, the at least one processor carrying out:

a training process of training an action recognition apparatus recited in claim 1 with use of a training data set in which an image sequence constituting a time series is associated with action information that indicates an action of a person who is included as a subject in an image included in the image sequence.

8. The training apparatus according to claim 7, wherein:

in the training process, the at least one processor trains the action recognition apparatus based on a loss that is obtained by inputting the first action feature information in the action recognition process, and on a loss that is obtained by inputting the second action feature information in the action recognition process.

9. A training method comprising:

a training process in which at least one processor trains an action recognition apparatus recited in claim 1 with use of a training data set in which an image sequence constituting a time series is associated with action information that indicates an action of a person who is included as a subject in an image included in the image sequence.

10. An action recognition method, comprising:

a first calculation process in which at least one processor calculates, based on a first partial sequence in an image sequence constituting a time series, first action feature information that indicates a feature of an action of a person who is included as a subject in an image included in the first partial sequence;

a second calculation process in which the at least one processor calculates, based on past feature information, second action feature information obtained by correcting the first action feature information, the past feature information having been calculated based on a plurality of second partial sequences including at least one past image which is prior to the first partial sequence in the image sequence; and an action recognition process in which the at least one processor recognizes an action of the person based on the second action feature information, wherein in the first calculation process, the at least one processor stores, in association with information identifying a partial sequence, the first action feature information, and in the second calculation process, the at least one processor:

obtains, as the past feature information, a plurality of pieces of first action feature information previously calculated for the person based on a plurality of second partial sequences, calculates, for each of the plurality of pieces of past feature information, a weight derived from a relevance between that past feature information and the first action feature information, the relevance representing a temporal dependence, and calculates the second action feature information by combining the first action feature information with an aggregate of the plurality of pieces of past feature information weighted by the calculated weights.

11. A non-transitory storage medium storing a program for causing a computer to carry out:

a first calculation process of calculating, based on a first partial sequence in an image sequence constituting a time series, first action feature information that indicates a feature of an action of a person who is included as a subject in an image included in the first partial sequence;

a second calculation process of calculating, based on past feature information, second action feature information obtained by correcting the first action feature information, the past feature information having been calculated based on a plurality of second partial sequences including at least one past image which is prior to the first partial sequence in the image sequence; and an action recognition process of recognizing an action of the person based on the second action feature information, wherein in the first calculation process, the program causes the computer to store, in association with information identifying a partial sequence, the first action feature information, and in the second calculation process, the program causes the computer to:

obtain, as the past feature information, a plurality of pieces of first action feature information previously calculated for the person based on a plurality of second partial sequences, calculate, for each of the plurality of pieces of past feature information, a weight derived from a relevance between that past feature information and the first action feature information, the relevance representing a temporal dependence, and calculate the second action feature information by combining the first action feature information with an aggregate of the plurality of pieces of past feature information weighted by the calculated weights.

\* \* \* \* \*